(12) United States Patent
Piao

(10) Patent No.: US 11,250,258 B2
(45) Date of Patent: Feb. 15, 2022

(54) SYSTEMS AND METHODS FOR PREVENTING INFORMATION DISSEMINATION FROM AN IMAGE OF A PUPIL

(71) Applicant: Citrix Systems, Inc., Burlington, MA (US)

(72) Inventor: Jian Piao, Nanjing (CN)

(73) Assignee: CITRIX SYSTEMS, INC., Burlington, MA (US)

( * ) Notice: Subject to any disclaimer, the term of this patent is extended or adjusted under 35 U.S.C. 154(b) by 86 days.

(21) Appl. No.: 16/659,728

(22) Filed: Oct. 22, 2019

(65) Prior Publication Data
US 2021/0081643 A1  Mar. 18, 2021

(30) Foreign Application Priority Data
Sep. 18, 2019  (WO) ................ PCT/CN2019/106344

(51) Int. Cl.
*G06T 7/514*  (2017.01)
*G06K 9/00*  (2022.01)

(52) U.S. Cl.
CPC ....... *G06K 9/0061* (2013.01); *G06K 9/00281* (2013.01); *G06K 9/00744* (2013.01); *G06T 7/514* (2017.01); *G06T 2207/30041* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 8,824,779 B1 * | 9/2014 | Smyth | G06T 7/593 382/154 |
| 2016/0210503 A1 * | 7/2016 | Yin | G06K 9/00335 |
| 2017/0092007 A1 * | 3/2017 | Goldberg | G06K 9/00597 |
| 2019/0042871 A1 * | 2/2019 | Pogorelik | H04N 5/23229 |
| 2020/0394290 A1 * | 12/2020 | Tussy | G06K 9/22 |

* cited by examiner

*Primary Examiner* — Idowu O Osifade
(74) *Attorney, Agent, or Firm* — Michael T. Abramson; Holland & Knight LLP

(57) ABSTRACT

Described embodiments provide a method, computer program product, and computer system for identifying, by a computing device, that an image is captured. A face in the image may be identified. An eye of the face in the image may be detected. A pupil of the eye included in the image may be detected, wherein the pupil may include objects reflected by the pupil. The objects reflected by the pupil may be augmented by augmenting the pupil in the image.

20 Claims, 6 Drawing Sheets

SYSTEMS AND METHODS FOR PREVENTING INFORMATION DISSEMINATION FROM AN IMAGE OF A PUPIL

RELATED APPLICATION

This application claims priority to PCT Application No. PCT/CN2019/106344, filed on 18 Sep. 2019, the entire contents of which are incorporated herein by reference.

BACKGROUND

With the advent of higher resolution cameras, a greater amount of detail may be captured in each picture. Some of this detail may be unknowingly used to determine information that the target of the image (or the person taking the image) may not want disseminated.

BRIEF SUMMARY OF DISCLOSURE

In one example implementation, a method, performed by one or more computing devices, may include but is not limited to identifying, by a computing device, that an image is captured. A face in the image may be identified. An eye of the face in the image may be detected. A pupil of the eye in the image may be detected, wherein the pupil may include objects reflected by the pupil. The objects reflected by the pupil may be augmented by augmenting the pupil in the image.

One or more of the following example features may be included. Augmenting the pupil of the eye may be automatic based upon, at least in part, detecting that the image is captured. Augmenting the pupil of the eye may be automatic based upon, at least in part, detecting that the image is uploaded. Detecting that the image is captured may include monitoring a location where the image is stored for updates. Augmenting the pupil of the eye may include blurring the pupil of the eye. Detecting the pupil of the eye may include one of a cumulative distribution function, a projection function, and an edges analysis. The image may be at least a portion of a video.

In another example implementation, a computing system may include one or more processors and one or more memories configured to perform operations that may include but are not limited to identifying that an image is captured. A face in the image may be identified. An eye of the face in the image may be detected. A pupil of the eye in the image may be detected, wherein the pupil may include objects reflected by the pupil. The objects reflected by the pupil may be augmented by augmenting the pupil in the image.

One or more of the following example features may be included. Augmenting the pupil of the eye may be automatic based upon, at least in part, detecting that the image is captured. Augmenting the pupil of the eye may be automatic based upon, at least in part, detecting that the image is uploaded. Detecting that the image is captured may include monitoring a location where the image is stored for updates. Augmenting the pupil of the eye may include blurring the pupil of the eye. Detecting the pupil of the eye may include one of a cumulative distribution function, a projection function, and an edges analysis. The image may be at least a portion of a video.

In another example implementation, a computer program product may reside on a computer readable storage medium having a plurality of instructions stored thereon which, when executed by one or more processors, may cause the one or more processors to perform operations that may include but are not limited to identifying that an image is captured. A face in the image may be identified. An eye of the face in the image may be detected. A pupil of the eye in the image may be detected, wherein the pupil may include objects reflected by the pupil. The objects reflected by the pupil may be augmented by augmenting the pupil in the image.

One or more of the following example features may be included. Augmenting the pupil of the eye may be automatic based upon, at least in part, detecting that the image is captured. Augmenting the pupil of the eye may be automatic based upon, at least in part, detecting that the image is uploaded. Detecting that the image is captured may include monitoring a location where the image is stored for updates. Augmenting the pupil of the eye may include blurring the pupil of the eye. Detecting the pupil of the eye may include one of a cumulative distribution function, a projection function, and an edges analysis. The image may be at least a portion of a video.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings may indicate like elements.

DETAILED DESCRIPTION

Higher resolution image capturing devices (e.g., cameras) may enable a greater amount of detail to be captured in each picture (or video) that is taken. For example, even cameras used in many mobile phones may have the ability to take 48 megapixel images and video. Some of this detail may be unknowingly used to determine information that the target of the image (or the person taking the image) may not want disseminated. For instance, the pupils of those whose picture is being taken may reflect the appearance of the surrounding area, similar to a mirror reflection. Given the high resolution of the image, the pupils may then be "blown up" or enhanced to reveal the reflection, which may contain information, such as human faces (not intended to be included in the picture), identifying landmarks to determine the location where the picture was taken, as well as any documents that may be reflected in the pupil. To help prevent the unknowing dissemination of such information, the present disclosure may help to augment the pupils in an image, thereby making the information unavailable to those that may enhance the image.

Figure 1:
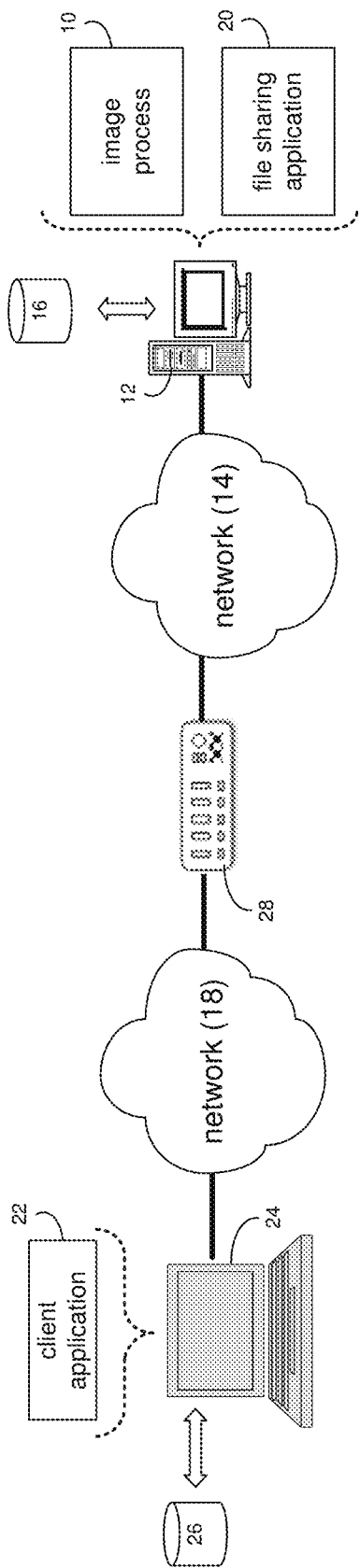
FIG. 1 is an example diagrammatic view of an example network environment according to one or more example implementations of the disclosure.

Referring now to the example implementation of FIG. 1, there is shown image process 10 that may reside on and may be executed by a computer (e.g., one or more remote machines also referred to as computer 12), which may be connected to a network (e.g., network 14) (e.g., the internet or a local area network). In some implementations, the instruction sets and subroutines of image process 10, which may be stored on storage device, such as storage device 16, coupled to computer 12, may be executed by one or more processors and one or more memory architectures included within computer 12. In some implementations, image process 10 may be a component of a data store, a standalone application that interfaces with the above noted data store and/or an applet/application that is accessed via client application 22. In some implementations, the above noted data store may be, in whole or in part, distributed in a cloud computing topology. In this way, computer 12 and storage device 16 may refer to multiple devices, which may also be distributed throughout the network. Computer 12 (e.g., via image process 10) may execute, operate or otherwise provide an application that may be any one of the following: software; a program; executable instructions; a virtual machine; a hypervisor; a web browser; a web-based client; a client-server application; a thin-client computing client; an ActiveX control; a Java® applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. In some implementations, image process 10 and/or file sharing application 20 may be accessed via one or more of client applications to facilitate the transfer of data and/or information among computer 12 and client electronic device 24 via network 14 and/or network 18. Client electronic device 24 (and/or computer 12) may include, but are not limited to, a personal computer, a mobile computing device such as a laptop computer, a smart/data-enabled, cellular phone, a notebook computer, and a tablet, a television, a smart speaker, an Internet of Things (IoT) device, a media (e.g., audio/video, photo, etc.) capturing and/or output device, an audio input and/or recording device (e.g., a microphone), a storage system (e.g., a Network Attached Storage (NAS) system, a Storage Area Network (SAN)), a server computer (e.g., a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality), a series of server computers, a server farm/datacenter, a mainframe computer, a computing cloud, or any other network enabled device. In some implementations, each of the aforementioned may be generally described as a computing device, and may also be referred to as a local machine, a client, a client node, a client computer, a client device, a client electronic device, a computing device, a computer, an endpoint, or an endpoint node, herein referred to as either a client electronic device or a computer. In some implementations, the client electronic devices may have the capacity to function as both a client node seeking access to resources provided by computer 12, and as computer 12 providing access to hosted resources for other client electronic devices.

In certain implementations, the client electronic devices and/or computer 12 may be a physical or virtual device. In many implementations, the client electronic devices and/or computer 12 may be any device capable of performing operations, such as a dedicated processor, a portion of a processor, a virtual processor, a portion of a virtual processor, portion of a virtual device, or a virtual device. In some implementations, a processor may be a physical processor or a virtual processor. The client electronic devices and/or computer 12 may be a virtual machine that may provide to a user of the client electronic device access to a computing environment. The virtual machine may be managed by, for example, a hypervisor, a virtual machine manager (VMM), or any other hardware virtualization technique. In some implementations, a virtual processor may correspond to one or more parts of one or more physical processors. In some implementations, the instructions/logic may be distributed and executed across one or more processors, virtual or physical, to execute the instructions/logic. The client electronic devices and/or computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the client electronic devices and/or computer 12 may include storage devices (e.g., storage device 16, 26) such as: an electrical connection having one or more wires; a portable computer diskette; a hard disk drive; all forms of flash memory storage devices including an erasable programmable read-only memory (EPROM); a tape drive; an optical drive/fiber; a Redundant Array of Independent Disks (RAID) array (or other array); a random access memory (RAM); a read-only memory (ROM); a portable compact disc read-only memory (CD-ROM); a digital versatile disk (DVD); a static random access memory (SRAM); a memory stick; a floppy disk; a mechanically encoded device; a media such as those supporting the internet or an intranet; a magnetic storage device; or combination thereof. In some implementations, the client electronic devices and/or computer 12 may include a data store, such as a database (e.g., relational database, object-oriented database, triplestore database, etc.) and may be located within any suitable memory location (e.g., storage device 16 coupled to computer 12). In some implementations, the storage devices may be communicatively coupled to the client electronic devices and/or computer 12 to store data, metadata, or other information to facilities operation of the present disclosure.

In some implementations, the client electronic devices and/or computer 12 may be communicatively coupled to the data store so that data, metadata, information, etc. described throughout the present disclosure may be stored and accessed. In some implementations, the client electronic devices and/or computer 12 may utilize any known database management system in order to provide multi-user access to one or more databases, such as the above noted relational database. In some implementations, the data store may also be a custom database, such as, for example, a flat file database or an XML database. In some implementations, any other form(s) of a data storage structure and/or organization may also be used.

In some implementations, computer 12 may execute a file sharing application (e.g., file sharing application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, a remote presentation services program or other program that uses a thin-client or a remote-display protocol to capture display output generated by an application executing on computer 12 and transmit the application display output to the client electronic device, or other application that allows for file sharing or even the general viewing of any content (e.g., website content, streaming video games or movies, etc.) on a computing device. An example of file sharing application 20 may include, but is not limited to, e.g., ShareFile® by Citrix Systems, Inc. of Ft. Lauderdale, Fla.

In some implementations, image process 10 may be a standalone application, or may be an applet/application/script/extension that may interact with and/or be executed within file sharing application 20, a component of file sharing application 20, and/or one or more of the client applications. In some implementations, file sharing application 20 may be a standalone application, or may be an applet/application/script/extension that may interact with and/or be executed within image process 10, a component of image process 10, and/or one or more of the client applications. In some implementations, one or more of the client applications may be a standalone application, or may be an applet/application/script/extension that may interact with and/or be executed within and/or be a component of image process 10 and/or file sharing application 20. Examples of client applications may include, but are not limited to, e.g., a web conferencing application, an image capturing device (e.g., camera) application, a video conferencing application, a voice-over-IP application, a video-over-IP application, an Instant Messaging (IM)/"chat" application, a short messaging service (SMS)/multimedia messaging service (MMS) application, a remote presentation services program or other program that uses a thin-client or a remote-display protocol to capture display output generated by an application executing on computer 12 and transmit the application display output to the client electronic device, or other application that allows for file sharing or even the general viewing of any content (e.g., website content, streaming video games or movies, etc.) on a computing device, a standard and/or mobile web browser, an email application (e.g., an email client application), a textual and/or a graphical user interface, a customized web browser, a plugin, an Application Programming Interface (API), or a custom application. The instruction sets and subroutines of client application 22, which may be stored on storage device 26, coupled to client electronic device 24, may be executed by one or more processors and one or more memory architectures incorporated into client electronic device 24.

In some implementations, client application 22 may be configured to effectuate some or all of the functionality of image process 10 (and image process 10 may be configured to effectuate some or all of the functionality of client application 22). Accordingly, in various implementations, image process 10 may be a purely server-side application, a purely client-side application, or a hybrid server-side/client-side application that is cooperatively executed by one or more of the client applications and/or image process 10.

In some implementations, client application 22 may be configured to effectuate some or all of the functionality of file sharing application 20 (and file sharing application 20 may be configured to effectuate some or all of the functionality of client application 22). Accordingly, in various implementations, file sharing application 20 may be a purely server-side application, a purely client-side application, or a hybrid server-side/client-side application that is cooperatively executed by one or more of the client applications and/or file sharing application 20. As one or more of the client applications, image process 10, and file sharing application 20, taken singly or in any combination, may effectuate some or all of the same functionality, any description of effectuating such functionality via one or more of the client applications, image process 10, file sharing application 20, or combination thereof, and any described interaction(s) between one or more of the client applications, image process 10, file sharing application 20, or combination thereof to effectuate such functionality, should be taken as an example only and not to limit the scope of the disclosure.

In some implementations, one or more users may access computer 12 and image process 10 (e.g., using one or more of client electronic devices) directly through network 14 or through secondary network 18, and image process 10 may include one or more user interfaces, such as browsers and textual or graphical user interfaces, through which users may access image process 10. Further, computer 12 may be connected to network 14 through secondary network 18. In some implementations, the client electronic devices may communicate with computer 12 (and vice versa) via intermediary appliance (e.g., appliance 28), which in some implementations may include image process 10. Appliance 28 may be positioned between networks 14 and 18, and may also be referred to as a network interface or gateway. In some implementations, appliance 28 may operate as an application delivery controller (ADC) to provide users with access to business applications and other data deployed in a datacenter, a cloud environment, or delivered as Software as a Service (SaaS) across a range of computing devices, and/or provide other functionality such as load balancing, etc. In some implementations, multiple appliances may be used, and appliance(s) 28 may be deployed as part of network 14 and/or 18.

In some implementations, one or more client electronic devices and/or computer 12 may be directly or indirectly coupled to networks 14 and/or 18 via a network connection (e.g., a wireless or a hardwired network connection). Further, in some examples, a wireless communication connection may include a wireless access point (WAP). The wireless access point may be, for example, an IEEE 802.11a, 802.11b, 802.11g, 802.11n, 802.11ac, Wi-Fi®, RFID, and/or Bluetooth™ (e.g., 802.15) (including Bluetooth™ Low Energy) device that is capable of establishing wireless communication channel (e.g., between client electronic device 24 and the WAP). In some examples, the client electronic devices and/or computer 12 may be wirelessly coupled to a network via wireless communication channel using cellular network/bridge.

In some implementations, networks 14 and/or 18 may include and/or be connected to one or more secondary networks, examples of which may include but are not limited to: a local area network (LAN); a personal area network (PAN); a metropolitan area network (MAN); a wide area network (WAN) or other telecommunications network facility, a primary public network; a primary private network; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of wireless local-area network (WLAN) interconnection (e.g., Near Field Communication (NFC)) may also be used.

In some implementations, various I/O requests may be sent from, e.g., client application 22 to, e.g., computer 12 (and vice versa) using network 14 and/or 18. Examples of an I/O request may include but are not limited to, data write requests (e.g., a request that content be written to computer 12) and data read requests (e.g., a request that content be read from computer 12).

Figure 2:
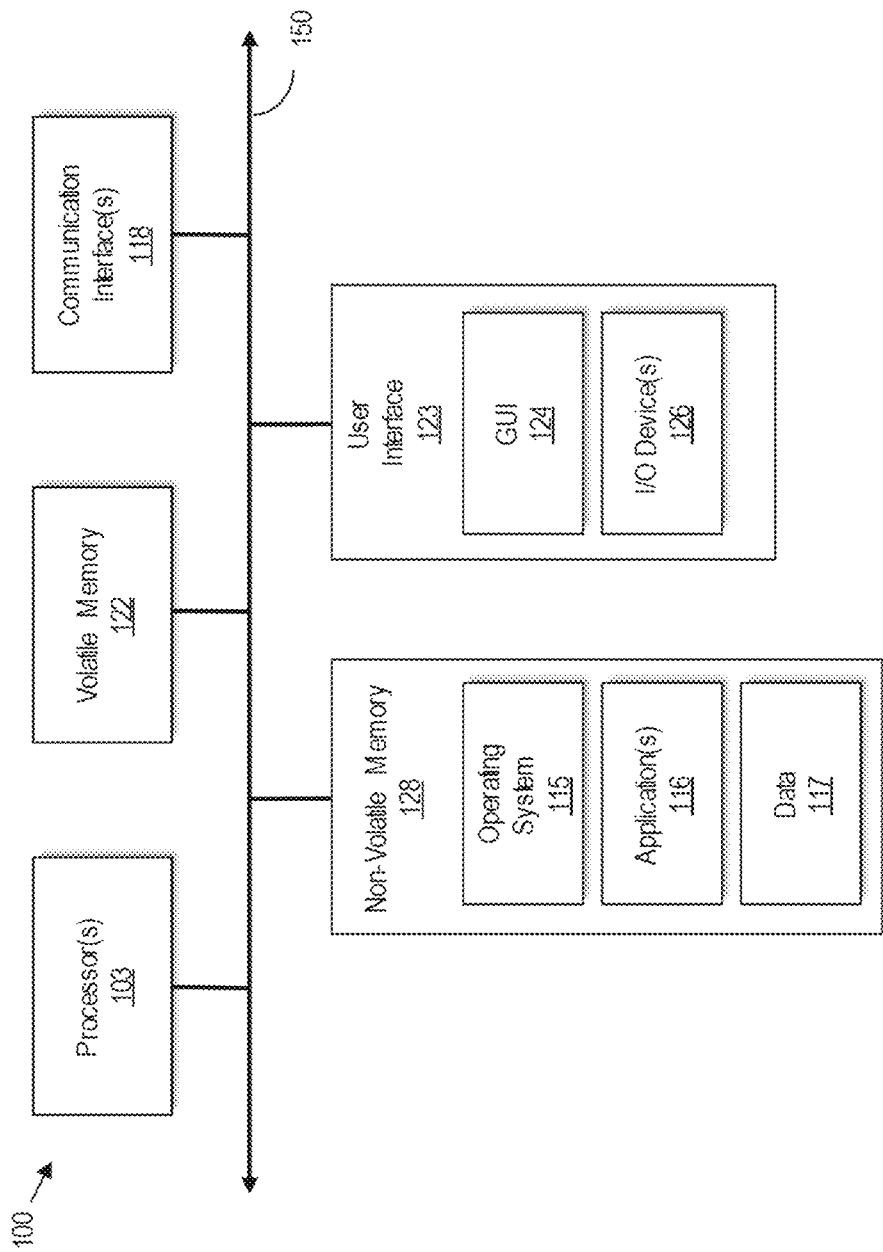
FIG. 2 is an example diagrammatic view of a computing device of FIG. 1 according to one or more example implementations of the disclosure.

Referring also to the example implementation of FIG. 2, there is shown a block diagram of computing device 100 that may be useful for practicing an implementation of the client electronic devices, appliance 28 and/or computer 12. computing device 100 may include one or more processors 103, volatile memory 122 (e.g., random access memory (RAM)), non-volatile memory 128, user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

UI 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 may store operating system 115, one or more applications 116, and data 117 such that, for example, computer instructions of operating system 115 and/or applications 116 are executed by processor(s) 103 out of volatile memory 122. In some implementations, volatile memory 122 may include one or more types of RAM and/or a cache memory that may offer a faster response time than a main memory. Data may be entered using an input device of GUI 124 or received from I/O device(s) 126. Various elements of computer 100 may communicate via communications bus 150.

Computing device 100 is shown merely as an example client device or server, and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" may describe circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some implementations, the processor may be embodied in one or more application specific integrated circuits (ASIC s), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some implementations, processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described implementations, computing device 100 may execute an application (e.g., the above-noted client application) on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
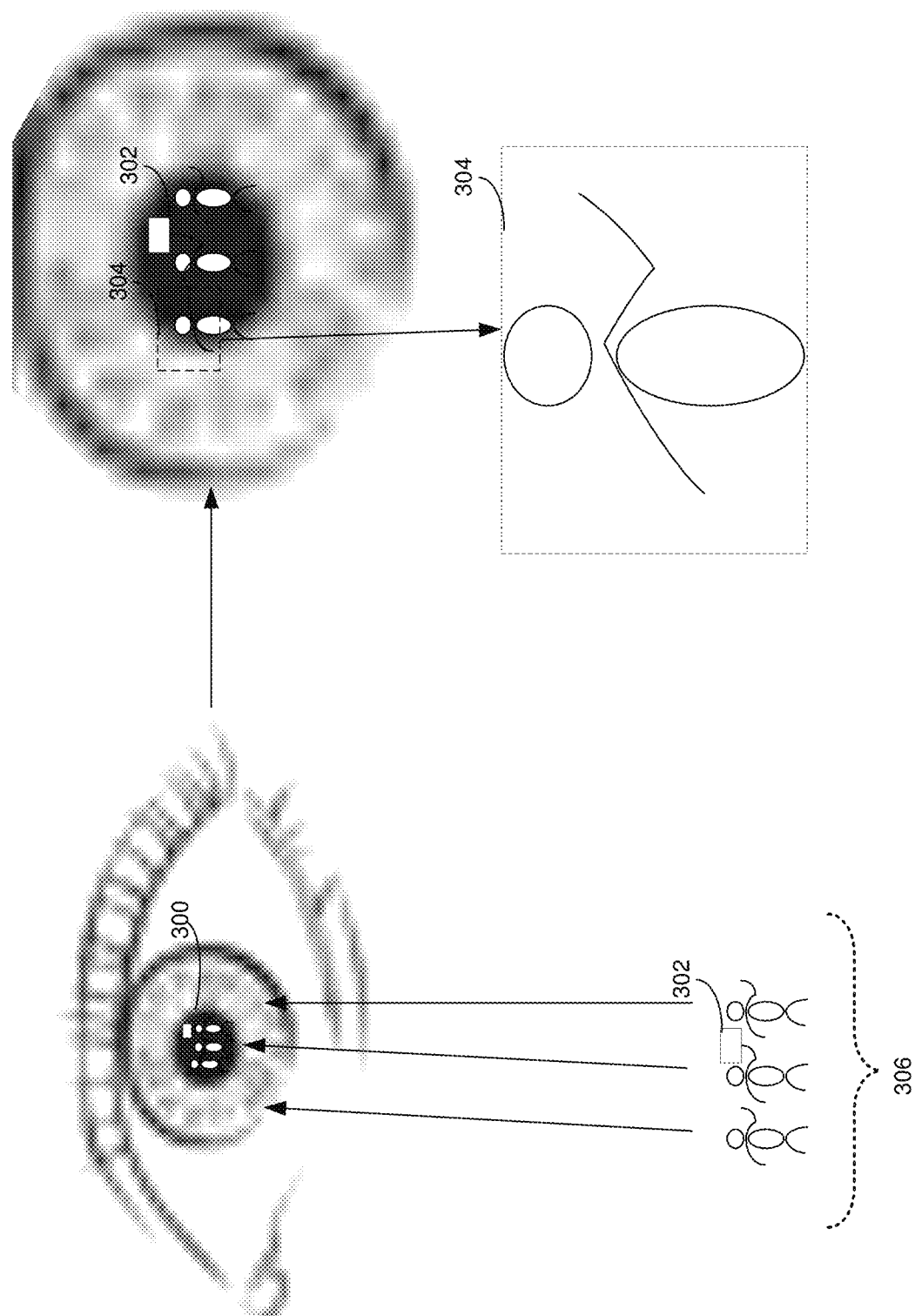
FIG. 3 is an example diagrammatic view of a pupil reflecting images according to one or more example implementations of the disclosure.

As noted above, higher resolution image capturing devices (e.g., cameras) may enable a greater amount of detail to be captured in each picture (or video) that is taken. For example, even cameras used in many mobile phones may have the ability to take 48 megapixel images and video. Some of this detail may be unknowingly used to determine information that the target of the image (or the person taking the image) may not want disseminated. For instance, and referring to the example FIG. 3, a diagram showing pupil 300 reflecting people 306 in front of pupil 300 is shown. In the example, a user may use camera 302 to take a picture of another user. The picture may include pupil 300 of the person whose picture is being taken, which is shown reflecting the appearance of the surrounding area, similar to a mirror reflection, thereby showing the people in front of pupil 300. That is, given the high resolution of the image, the pupils may then be "blown up" or enhanced to reveal the reflection, which may contain information, such as human faces (not intended to be included in the picture), identifying landmarks to determine the location where the picture was taken, as well as any documents that may be reflected in the pupil. An example of a portion of pupil 300 being blown up to show a clearer view of one of the human faces reflected in pupil 300 is shown in dashed box 304. To help prevent the unknowing dissemination of such information, the present disclosure may help to augment the pupils in an image, thereby making the information unavailable to those that may enhance the image. Notably, this problem does not occur when the subject of the picture has "red-eye" (i.e., when a camera captures light reflecting from the retina at the back of the eye when a flash is used at night and in dim lighting). This is because the unintended "red-eye" already likely covers any information that may be reflected in the pupil/retina. As such, the present disclosure need not (but may) be applied to eyes that have red-eye, and is not intended to be used as red-eye correction.

Figure 4:
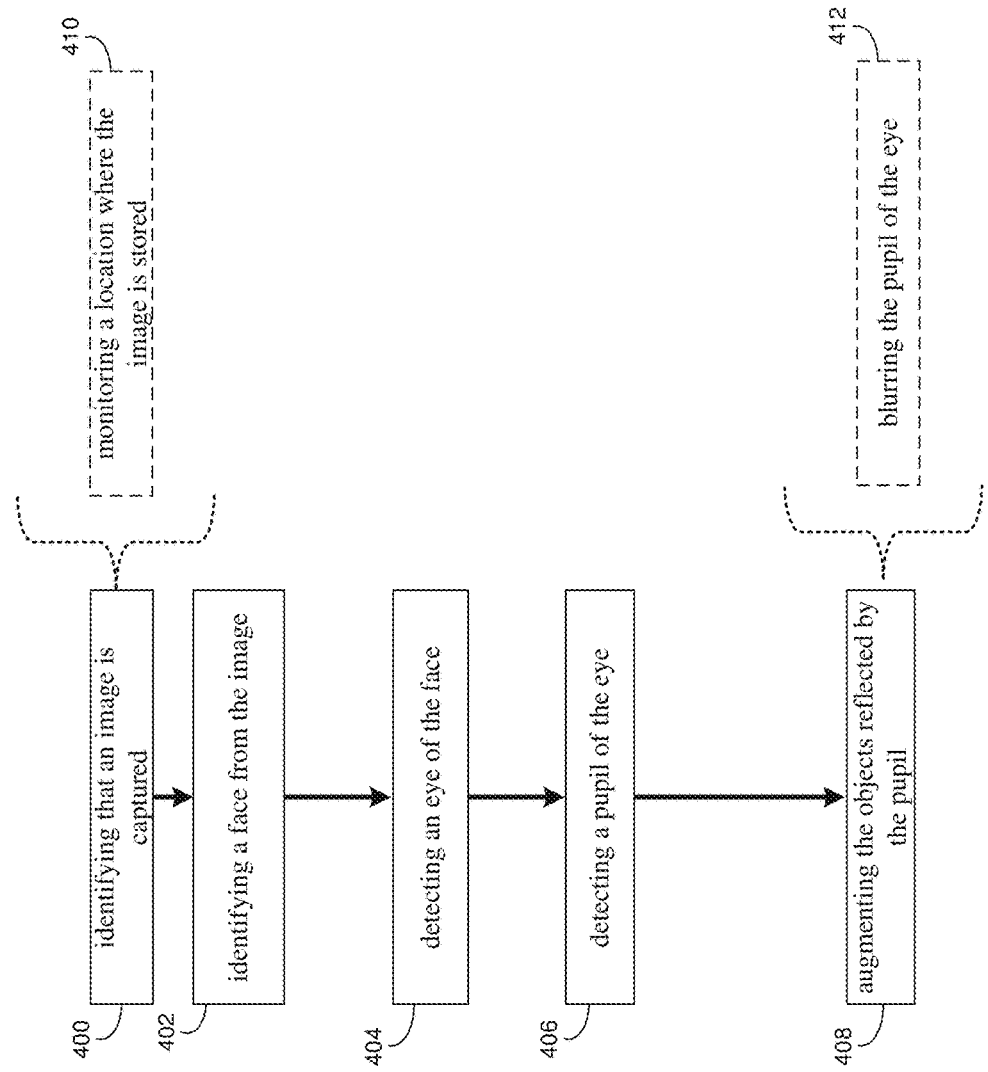
FIG. 4 is an example flowchart of an image process according to one or more example implementations of the disclosure.
Figure 5:
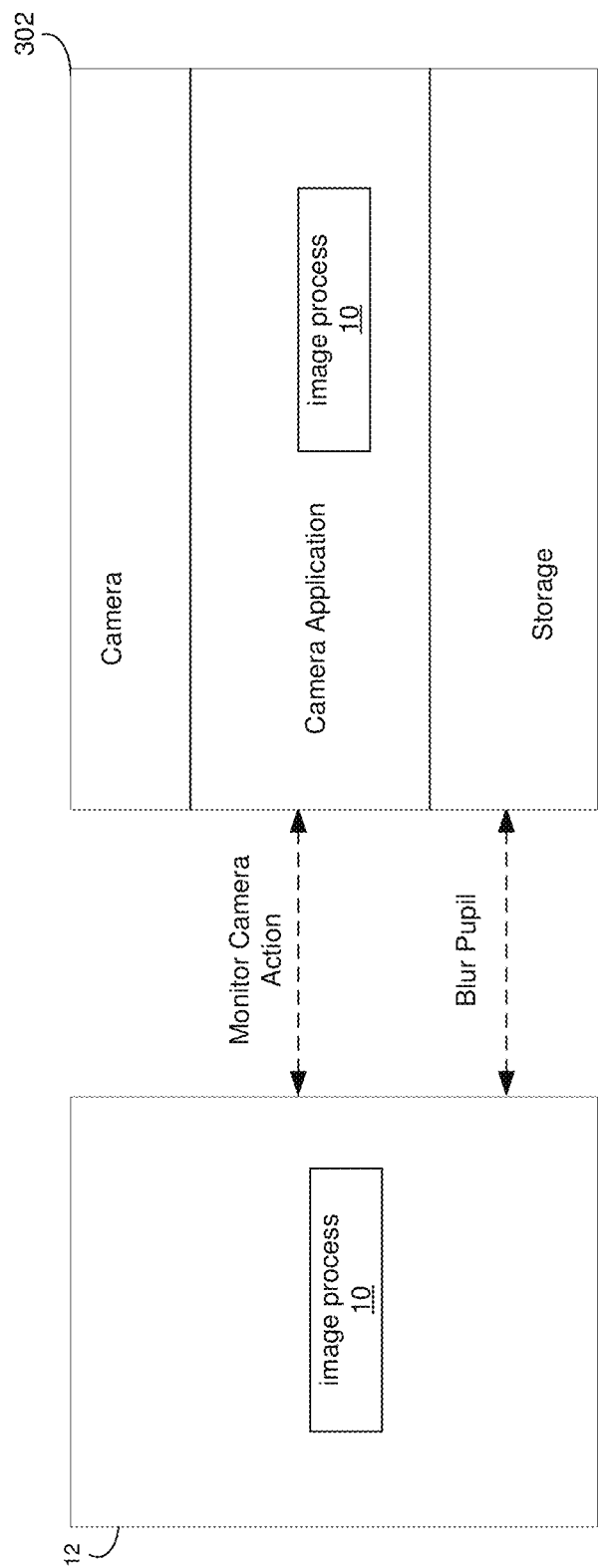
FIG. 5 is an example diagrammatic view of diagrammatic view of an image process according to one or more example implementations of the disclosure.
Figure 6:
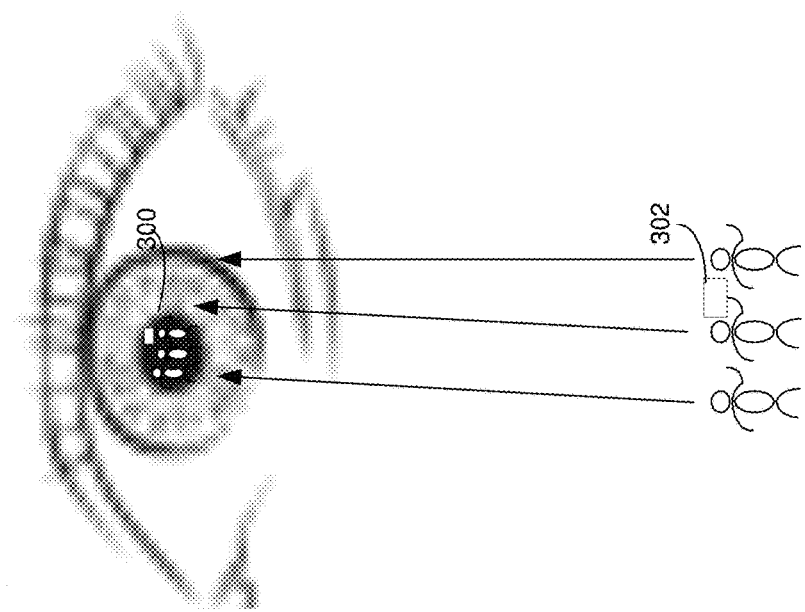
FIG. 6 is an example diagrammatic view of a pupil before and after augmentation by an image process according to one or more example implementations of the disclosure.

As discussed above and referring also at least to the example implementations of FIGS. 4-6, at block 400, image process 10 may identify that an image is captured. At block 402, image process 10 may identify a face in the image. At block 404, image process 10 may detect an eye of the face in the image. At block 406, image process 10 may detect a pupil of the eye in the image, wherein the pupil may include objects reflected by the pupil. At block 408, image process 10 may augment the objects reflected by the pupil by augmenting the pupil in the image.

In some implementations, at block 400, image process 10 may identify that an image is captured. For instance, and referring at least to the example implementation of FIG. 5, an example diagrammatic view of the image process is shown. In the example, camera 302 (also shown in FIG. 3) may capture an image, which may be detected/identified and processed by image process 10 (e.g., via the camera application). In the example, image process 10 may store the captured image locally on the camera, and/or may download/upload the image to/from remote storage (e.g., a file sharing server such as computer 12 also shown in FIG. 1). As noted above regarding FIG. 3, the image may include pupil 300 of the person whose picture is being taken, which is shown reflecting the appearance of the surrounding area, similar to a mirror reflection, thereby showing the people in front of pupil 300.

In some implementations, at optional block 410, detecting that the image is captured may include image process 10 monitoring a location where the image is stored for updates. For example, the camera application (e.g., via image process 10) may store the image locally on the camera (e.g., removable storage, internal storage of the camera, etc.) and/or may store the remotely (discussed further below). In the example, image process 10 may monitor the storage location where the image is to be stored for any updates. When an update to this storage location is detected, this may indicate a new image has been captured. In some implementations, a timestamp may be applied to each image, where the newest timestamp may indicate a new image has been captured.

In some implementations, at block 402, image process 10 may identify a face in the image. For example, facial analysis on the image may be performed. Image process 10 may include facial recognition technology (e.g., a facial recognition API) that may detect one or more human faces in an image obtained from the above-noted camera. In some implementations, facial detection and recognition may thus be used to identify where a face is located in the image.

In some implementations, at block 404, image process 10 may detect an eye of the face in the image. For instance, in some implementations, eyes may be detected based on the assumption that they are darker than other parts of the face. In some implementations, morphological operations may be used to locate eye-analogue segments, and in other implementations, small patches in the input image may be searched that are roughly as large as an eye and are darker than their surroundings. In some implementations, image process 10 may directly search for eye-analogue segments within the face region by considering, e.g., potential eye regions, the non-skin regions within face region, etc. In some examples, an ellipse may be fitted to each potential eye region using a connected component analysis. A pair of potential eye regions may be considered as eyes when it satisfies some constraints based on anthropological characteristics of human eyes. It will be appreciated that any technique for detecting eyes in an image may be used without departing from the scope of the disclosure. As such, any particular eye detection technique described should be taken as example only and not to otherwise limit the scope of the present disclosure.

In some implementations, at block 406, image process 10 may detect a pupil of the eye in the image, wherein the pupil may include objects reflected by the pupil. For example, as discussed above, it is the pupil that may include the reflection of the objects (e.g., people, places, documents, etc.). As such, in the example, image process 10 may want to detect whether the pupil is visible in the image, since resources need not be used for one or more aspects of the present disclosure if the pupil is not visible. Similarly, in some implementations, image process 10 may use any facial and/or object identification/classification techniques to detect whether the pupil includes reflected objects that are visible in the image, since resources need not be used for one or more aspects of the present disclosure if there are no objects reflected in the pupil that are visible.

In some implementations, detecting the pupil of the eye may include one of a cumulative distribution function, a projection function, and an edges analysis. For example, a cumulative distribution function may be based on the observation that an eye iris and pupil is much dimmer than the cornea. For example, image process 10 may change the intensity of each pixel of the input image, and may apply a minimum filter to remove singular white points and compact white region. Image process 10 may then choose one white pixel, which is the darkest on the original input image. This pixel may be referred to as Pixel with Minimum Intensity (PMI). As the probability that PMI belongs to an eye iris and not to a pupil is significant, further processing may be needed, where image process 10 may return to the original image and measure the average intensity (AI) in a, e.g., 10×10 pixel square around the PMI. The region may be expanded to, e.g., 15×15 pixels and the minimum filter may be applied. The eye center is assumed to be a geometrical center of points of intensity lower than AI calculated before.

The projection function may be similar to the above cumulative distribution function, but in this case, pixel intensities may be projected on vertical and horizontal axes. Those projections may divide the whole picture to homogenous subsets.

The edges analysis may build upon techniques where the edge pixel information is used for eye location in a picture of a human face. The input frame may be processed by the edges detection analysis for digital images. Two threshold values may be used in this example, e.g., upper and lower. The upper threshold value may define the minimum gradient needed to classify a pixel as an edge component, which in some implementations may be set to 1.5 and 2.0 times the mean luminosity, respectively. Such a pixel may also be called a strong edge pixel. In the edge, there may also be pixels of a gradient between the upper and lower threshold values, having at least one strong edge pixel as a neighbor. The lower threshold protects against splitting edges in low contrast regions. The output may be a binary picture with edges marked white. Pupil detection may then include finding vertical and horizontal lines sharing the next to highest number of points with the edges. The intersection of the lines may indicate the pupil center. It will be appreciated that any technique for detecting pupils and determining the coordinates of the pupils in an image may be used without departing from the scope of the disclosure. As such, any particular pupil detection technique described should be taken as example only and not to otherwise limit the scope of the present disclosure.

In some implementations, at block 408, image process 10 may augment the objects reflected by the pupil by augmenting the pupil in the image. For instance, as noted above, it is the pupil that may include the reflection of the objects (e.g., people, places, documents, etc.) that the subject of the image or those shown in the reflection of the pupil may not want to be disseminated. As such, in the example, image process 10 may alter or change the portion of the image that includes the pupil to thereby prevent anyone seeing the objects in the pupil if it were to be later enhanced or "blown up".

In some implementations, at optional block 412, augmenting the pupil of the eye may include image process 10 blurring the pupil of the eye. For example, a rather than blurring too much of the eye (thereby making the image look less natural) image process 10 may blur any arbitrary shapes in an image, including as much of the pupil as is needed to prevent dissemination of the pupil reflections. For accuracy, image process 10 may use any eye and pupil detection technique to thus obtain the coordinates of the pupil in the image, which may be used for determining which portions of the image to blur. In some implementations, these coordinates may be obtained by and/or passed to any known blurring algorithm (which may be included as part of image process 10), where it will blur a closed polygon (or other shape) formed by those coordinates. To further help make the blurring look more natural to the subject's original pupil colors, image process may include a "soft" blurring technique with one or more soft blurring iterations, such that the blurred portion blends into the image in the background. As an example, the coordinates to blur may be defined by, e.g., [x,y,width,height] such that it blends with the background.k-size,sigmaX of the coordinates. It will be appreciated that any technique for blurring or otherwise augmenting pupils in an image may be used without departing from the scope of the disclosure. As such, any particular blurring, masking, or other augmentation technique described should be taken as example only and not to otherwise limit the scope of the present disclosure.

Referring to the example FIG. 6, a diagrammatic view of pupil 300 before augmentation (left) and after augmentation (right) is shown. As can be seen, the example reflections of the people in front of pupil 300 are no longer visible after augmentation. Accordingly, it may not be noticeable that any augmentation occurred when the image is viewed under normal circumstances, but if the pupil were to be later enhanced or "blown up," the objects in the pupil would not be discernable.

In some implementations, augmenting the pupil of the eye may be automatic based upon, at least in part, detecting/identifying that the image is captured. For example, once image process 10 detects that an image has been captured (as discussed above), image process 10 may automatically augment the pupil in an attempt to ensure the reflections of the people in front of pupil 300 are no longer visible. As noted above, image process 10 may be located on the camera (or mobile device including a camera), which may augment the pupil locally. In some implementations, image process 10 may augment the pupil prior to storing the final image, rather than augmenting the pupil after storing the image. It will be appreciated that image process 10 may also augment the pupil at any time after the image is captured (e.g., augmenting multiple images in a batch).

In some implementations, augmenting the pupil of the eye may be automatic based upon, at least in part, detecting that the image is uploaded. For example, the captured image may never be used or may be deleted shortly after being taken. Rather than using resources unnecessarily, image process 10 may augment the pupil upon detection that the image is being uploaded (or downloaded) to remote storage. In some implementations, where image process 10 is executed locally on the camera, image process 10 may augment the pupil locally upon detecting that the image is being uploaded (or downloaded) and may do so prior to the upload/download (e.g., upon receiving a request to upload/download the image). In some implementations, where image process 10 is executed on remote storage (e.g., a file sharing server), image process 10 may augment the pupil on the file sharing server or on some intermediary network device after detecting/identifying that the image has been captured, which may include identifying that the image has been uploaded (or downloaded) (e.g., upon sending/receiving a notification that the image has been uploaded/downloaded successfully).

In some implementations, the image may be at least a portion of a video. For example, since a video is composed of many images, image process 10 may augment each pupil of each image of a video to accomplish the same goal discussed above. In some implementations, this augmentation may occur in real-time, or may occur after the video is complete. Similar to the above discussion, image process 10 may augment the pupil in the video images upon detection that the video is being uploaded (or downloaded) to remote storage. In some implementations, where image process 10 is executed locally on the camera, image process 10 may augment the pupil in the video locally upon detecting that the video is being uploaded (or downloaded) and may do so prior to the upload/download (e.g., upon receiving a request to upload/download the video). In some implementations, where image process 10 is executed on remote storage (e.g., a file sharing server), image process 10 may augment the pupil of the video on the file sharing server or on some intermediary network device after detecting that the video has been uploaded (or downloaded) (e.g., upon sending/receiving a notification that the video has been uploaded/downloaded successfully).

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code or machine code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network BAN), a personal area network (PAN), a metropolitan area network (MAN), etc., or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A method comprising:
   identifying, by a computing device, that an image is captured;
   identifying a face in the image;
   detecting an eye of the face in the image;
   detecting a pupil of the eye in the image, wherein the pupil includes objects reflected by the pupil; and
   augmenting the objects reflected by the pupil by augmenting the pupil in the image, wherein augmenting the pupil of the eye is automatic based upon, at least in part, detecting that the image is to be one of uploaded and downloaded.

2. The method of claim 1 wherein detecting that the image is to be one of uploaded and downloaded includes receiving a request to download the image.

3. The method of claim 1 wherein detecting that the image is to be one of uploaded and downloaded includes receiving a request to upload the image.

4. The method of claim 2 wherein detecting that the image is captured includes monitoring a location where the image is stored for updates.

5. The method of claim 1 wherein augmenting the pupil of the eye includes blurring the pupil of the eye.

6. The method of claim 1 wherein detecting the pupil of the eye includes one of a cumulative distribution function, a projection function, and an edges analysis.

7. The method of claim 1 wherein the image is at least a portion of a video.

8. A computer program product residing on a non-transitory computer readable storage medium having a plurality of instructions stored thereon which, when executed by one or more processors, causes the one or more processors to perform operations comprising:
   identifying that an image is captured;
   identifying a face in the image;
   detecting an eye of the face in the image;
   detecting a pupil of the eye in the image, wherein the pupil includes objects reflected by the pupil; and
   augmenting the objects reflected by the pupil by augmenting the pupil in the image, wherein augmenting the pupil of the eye is automatic based upon, at least in part, detecting that the image is to be one of uploaded and downloaded.

9. The computer program product of claim 8 wherein detecting that the image is to be one of uploaded and downloaded includes receiving a request to download the image.

10. The computer program product of claim 8 wherein detecting that the image is to be one of uploaded and downloaded includes receiving a request to upload the image.

11. The computer program product of claim 8 wherein detecting that the image is captured includes monitoring a location where the image is stored for updates.

12. The computer program product of claim 8 wherein augmenting the pupil of the eye includes blurring the pupil of the eye.

13. The computer program product of claim 8 wherein detecting the pupil of the eye includes one of a cumulative distribution function, a projection function, and an edges analysis.

14. The computer program product of claim 8 wherein the image is at least a portion of a video.

15. A computing system comprising:
    a memory; and
    at least one processor in communication with the memory, the at least one processor configured to:
    identify that an image is captured;
    identify a face in the image;
    detect an eye of the face in the image;
    detect a pupil of the eye in the image, wherein the pupil includes objects reflected by the pupil; and
    augment the objects reflected by the pupil by augmenting the pupil in the image, wherein augmenting the pupil of the eye is automatic based upon, at least in part, detecting that the image is to be one of uploaded and downloaded.

16. The computing system of claim 15 wherein detecting that the image is to be one of uploaded and downloaded includes at least one of receiving a request to upload the image and receiving a request to download the image.

17. The computing system of claim 15 wherein detecting that the image is captured includes monitoring a location where the image is stored for updates.

18. The computing system of claim 15 wherein augmenting the pupil of the eye includes blurring the pupil of the eye.

19. The computing system of claim 15 wherein detecting the pupil of the eye includes one of a cumulative distribution function, a projection function, and an edges analysis.

20. The computing system of claim 15 wherein the image is at least a portion of a video.

* * * * *